United States Patent
Kiceniuk

[15] 3,682,070
[45] Aug. 8, 1972

[54] RANGEFINDER AND METHOD

[72] Inventor: Taras Kiceniuk, 2816 Highview, Altadena, Calif.

[22] Filed: Oct. 26, 1970

[21] Appl. No.: 83,741

[52] U.S. Cl. ................................95/44 C, 95/1.1
[51] Int. Cl. .........................................G03b 3/04
[58] Field of Search ...........................95/44 C, 1.1

[56] References Cited

UNITED STATES PATENTS

| | | |
|---|---|---|
| 3,495,267 | 2/1970 | Brodie ........................95/1.1 |
| 2,554,798 | 6/1951 | Schwartz et al. ...........95/44 C |
| 2,737,864 | 3/1956 | Gutterman et al. ..........95/1.1 |

*Primary Examiner*—Samuel S. Matthews
*Assistant Examiner*—E. M. Bero
*Attorney*—Fulwider, Patton, Rieber, Lee & Utecht

[57] ABSTRACT

A rangefinder and a rangefinding method, the rangefinder being combined with a motion picture camera and comprising a transparent mirror mounted on the camera in an upwardly and forwardly inclined position across the line of sight from an operator behind the camera to an object in front of the camera for viewing of the object through the mirror while the reflection of a second object a selected distance from the mirror is reflected therefrom in superimposed relation with the first object. This permits visual stereoscopic evaluation of the relative spacing of the two objects from the mirror and correction in the focus of the camera by moving the latter closer to or farther from the photographic object to maintain the two objects the same distance from the mirror. Alternatives include photographing of one object through the mirror in timed relation with periodic illumination of the reflected object, and photographing of the reflection of one object in timed relation with periodic illumination of the other.

13 Claims, 5 Drawing Figures

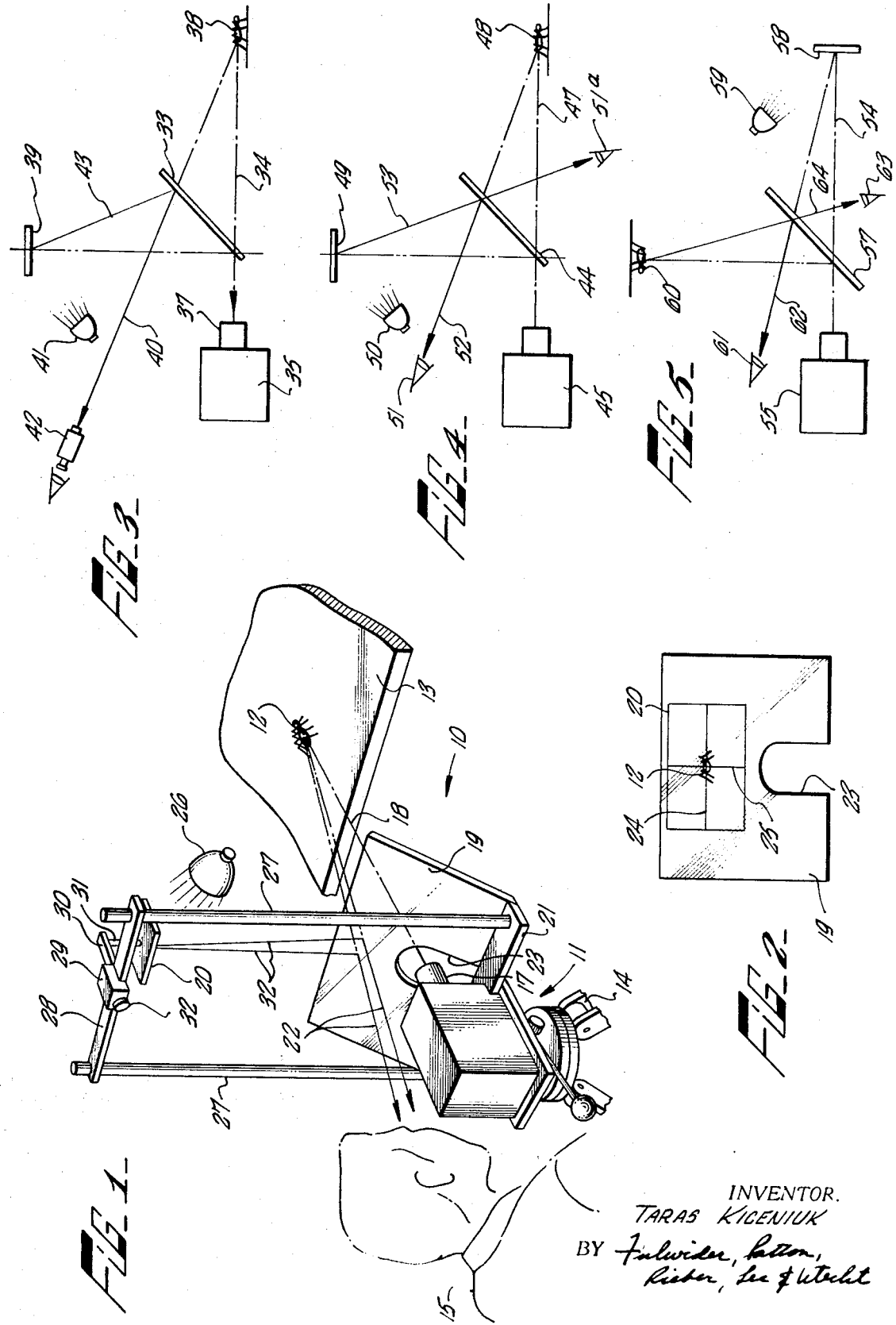

RANGEFINDER AND METHOD

BACKGROUND OF THE INVENTION

This invention relates to rangefinding in connection with photography, and to a rangefinding method and apparatus primarily designed for use in combination with a camera to establish and maintain, within very close limits, a selected distance between the camera and an object which is the subject to be photographed.

The invention has particular utility in connection with close-up photography such as nature photography of small animals or insects which are likely to move while being photographed, thus tending to move out of the depth of field for which the camera is focused, that is, out of the range of distances within which the subject must be located in order to produce a reasonably sharply focused image. Another likely use is for close-up medical, industrial and commercial photography or the like. In close-up photography of an object within a few feet of the camera, the focus problem is particularly acute, since it is necessary to maintain the camera-to-object distance within tolerances on the order of one inch on either side of the optimum distance for a satisfactorily focused image.

Sophisticated rangefinders and focusing aids of various types are well known and are capable of providing a ready indication of when proper focus has been achieved. One popular focusing aid uses a ground glass viewer upon which an image is focused when the image is properly focused upon the film. Representative of conventional types of rangefinders are the swivelling-mirror type which produce coincident images when a proper focus has been achieved, and the split-image type in which the image is divided into upper and lower halves which are laterally displaced unless the image is properly focused.

With all such rangefinders and focusing aids, it is impractical, if at all possible, to maintain proper focus on a moving object such as a crawling insect, particularly in close-up photography in which the depth of field is very small. The manipulations necessary to re-focus the camera simply are not feasible without interruption of the photographic sequence. Accordingly, after the camera has been focused initially upon the position in which the subject is to be photographed, any substantial movement of the subject closer to, or farther away from, the camera necessitates either hit-and-miss compensation by the camera operator or interruption of the sequence for re-focusing.

SUMMARY OF THE INVENTION

The present invention resides in a novel rangefinder and rangefinding method for establishing and maintaining a selected camera-to-object distance in a relatively simple and inexpensive manner which permits continuous visual evaluation of the position of the photographic object, or subject, relative to the optimum position, and indicates to the operator what corrections should be made in camera position relative to the subject to maintain proper focus. More specifically, the invention utilizes a partially reflective, transparent viewing element, such as a half-silvered or partially aluminized mirror, supported in a fixed position relative to the camera for viewing of a subject through the viewing element, and a reference object is positioned at a selected distance from the viewing element to reflect an image of the reference object back toward the camera so that the subject and the virtual image of the reference object are seen simultaneously by the camera operator, preferably in apparently superimposed relation.

When the selected distance at which the reference object is spaced from the viewing element is the same as the spacing of the subject from the viewing element with the desired camera-to-object distance, it has been found that the camera operator can stereoscopically evaluate variations in the actual subject position from the optimum position within very close tolerances, and correct the camera position before the subject moves out of the depth of field, thus maintaining proper focus despite substantial movements of the subject during a photographic sequence.

In one illustrative form of the apparatus, a partially reflective mirror is mounted on the front of a camera and formed with a notch through which the camera photographs a subject, the reference object having a reticle that is adjustably supported above the mirror to reflect its image from the portion of the mirror through which the subject is viewed by the camera operator. In another form, the mirror is positioned above the optical axis of the camera to reflect an image from an illuminated reference object while the subject is viewed through the mirror with the assistance of a binocular device for improved stereoscopic vision or magnification of the object.

Additional variations include an embodiment in which the subject is photographed through the mirror and a reference object is reflected on the mirror periodically, in timed relation with the operation of the shutter of the camera, so that the reflection appears only between exposures, unless the reflection of the reference object is to be photographed in superimposed relation with the subject, and another embodiment in which a periodically illuminated reference object may be viewed through a mirror and the reflection of a subject is viewed in superimposed relation with the image of the reference object and photographed off the mirror while the illumination for the reference object is deenergized, again in timed relation with the operation of the camera.

Other features and advantages of the present invention will become apparent from the following detailed description, taken in conjunction with the accompanying drawings.

BRIEF DESCRIPTION OF THE DRAWINGS

FIG. 1 is a fragmentary perspective view schematically showing a rangefinder embodying the novel features of the present invention in combination with a conventional motion picture camera;

FIG. 2 is an elevational view of the viewing element of FIG. 1 showing the reference object and photographic subject as seen by the camera operator;

FIG. 3 is a schematic side elevational view illustrating an alternative form including a stereoscopic binocular device and an illuminated reference object;

FIG. 4 is a view similar to FIG. 3 illustrating a second alternative form using a periodically illuminated reference object and a viewing element through which the subject is photographed; and FIG. 5 is a view similar to FIGS. 3 and 4 illustrating a third alternative form in which the reference object is illuminated periodically for viewing through a viewing element or its reflection off the viewing element and the reflection of the photographic object is photographed from the viewing element between illuminations of the reference object, this view being either a side elevation or a plan view.

DETAILED DESCRIPTION

As shown in the drawings for purposes of illustration, the invention is embodied in a rangefinder indicated generally by the reference number 10, in combination with a motion picture camera 11 for photographing an object such as a tarantula 12 (FIG. 1) while the latter is free to move along a stage 13 or other support. The camera, which may be any one of several conventional types, is shown as mounted on a stand 14 or dolly with an operator 15 standing behind the camera in the usual operating position and with the lens barrel 17 of the camera pointed toward the subject, the optical axis of the camera being indicated at 18.

As previously mentioned, conventional rangefinders and other focusing aids are available for use in focusing such a camera on an object to be photographed, but special problems arise when a picture is to be made of a moving object. This is particularly true of close-up photography in which the depth of field is small, and movement of the object by as little as a few inches can result in an out-of-focus condition. Moreover, it is not practical with such conventional focusing aids for the operator to adjust the focus calibration of the camera while continuing to operate the camera, and, as a result, it has been difficult to obtain satisfactory results in such close-up photography of moving subjects. It should be understood, however, that while the invention is particularly useful for this purpose, its utility is not limited thereto.

In accordance with the present invention, the rangefinder 10 comprises a partially reflective, transparent viewing element 19 which is interposed between the camera operator 15 and the subject 12, in a fixed position relative to the camera for viewing of the subject through the viewing element 19, and a reference object 20 is positioned a selected distance from the viewing element for reflection of its image from the viewing element back toward the operator, who thus can view both the reflected image and the real image, simultaneously, while operating the camera. The reference object 20 is spaced from the viewing element 19 the same distance as the optimum spacing of the subject 12 from the viewing element so that the virtual image of the reference object apparently lies in the same plane as the subject. With this arrangement, an operator having stereoscopic vision can determine when the subject is either in front of or behind the plane of the virtual image, can see the direction of such displacement, and can take appropriate corrective action before the subject moves out of the depth of field of the camera.

In the embodiment shown in FIG. 1, the viewing element 19 is a flat so-called transmitting mirror of generally rectangular shape, and is mounted on a narrow platform 21 on the front lower edge of the camera in an upwardly and forwardly inclined position. The representative angle is on the order of 45° but is not limited to any fixed value. The upper edge portion of the mirror extends well above the level of the lens barrel 17 of the camera and lies between the operator and the subject 12 so that the operator's lines of sight 22 pass through the mirror. An opening in the form of an inverted U-shaped notch 23 is formed in the central lower edge portion of the mirror in front of the lens barrel for photographing of the subject 12 through the notch. It will be evident that the platform 21 and the lower edge of the mirror can be mounted above the lens barrel to eliminate the need for the notch 23.

While the reference object 20 may take various two and three dimensional forms and may be supported in various ways, the preferred embodiment comprises a flat rectangular plate which is disposed in a horizontal plane directly above the upper edge portion of the mirror and has cross-lines 24 and 25 (FIG. 2) printed on its underside to form a reticle. Light lines on a dark background usually are preferred. Either natural illumination or a lamp 26 provides the light necessary to reflect an image of the reticle plate from the mirror.

To support the plate 20 above the mirror 19, two parallel posts 27 extend upwardly from the ends of the platform 21, on opposite sides of the camera, and a horizontal cross-bar 28 is supported between the upper end portions of these posts with a slide 29 dovetailed onto the cross-bar and carrying the reticle plate 20 on a forwardly projecting arm 30 from which the plate is suspended on a depending rod 31. This provides a frame mounted in a fixed position relative to the camera for supporting the reference object above the mirror.

Clamping means preferably are provided to hold the cross-bar 28 at different selected or adjustable levels along the posts 27, and a thumb screw 32 clamps and releases the slide 29 relative to the cross-bar for adjustment of the lateral position of the slide along the cross-bar. Similar adjustments can be provided for the amount of forward projection of the arm 30 from the slide, and the angular position of the rod 31 and the reticle plate relative to the arm. Thus, the reticle plate may be selectively positioned above the mirror for different object-to-mirror distances, and also may be turned, if desired, for use with a camera having an angularly adjustable lens.

With the foregoing arrangement, and assuming that a live object such as the tarantula 12 is to be photographed, the initial focusing of the camera 11 may be accomplished with a dummy subject (not shown) on the stage 13 in the preferred initial position of the subject thereby determining the composition of the initial field through the camera finder and focusing the camera on the dummy subject with the conventional ground glass focusing aid that is part of the camera. The dummy subject may be a rectangular ink drawing of the camera window with the reticle lines 24 and 25 thereon.

After the camera 11 has been focused on the dummy object, a duplicate thereof may be used as the reference object and mounted on the supporting frame as the reticle plate 20. With the dummy subject on the stage 13 and the reticle plate 20 on the frame, the position of the reticle plate is adjusted on the frame until its reflection from the transparent mirror 19 coincides, in field size and apparent position, with the dummy subject. Then the position of the reticle plate is fixed, and the camera is ready for operation.

To photograph the tarantula 12, the dummy subject is removed from the stage 13 and the tarantula is placed in the same position. The camera operator then views the tarantula through the transparent mirror, upon which the image of the reticle plate 20 is reflectively superimposed, as indicated at 20, 24 and 25 in FIG. 2, and any movement of the tarantula which tends to change the camera-to-subject distance can be matched by the operator by movement of the camera relative to the stage. This, of course, can be accomplished either by moving the camera or by moving the stage with a suitable positioning mechanism and controls (not shown). Although stereoscopic vision is required to make the visual evaluation of the position of the subject relative to the apparent position of the reticle plate, most people are capable of making this evaluation.

It is to be noted that the camera operator 15 continuously and directly views the scene being photographed, and that both the need for corrective movement of the camera 11 and the direction of such movement are readily and immediately apparent at all times. Thus, if the tarantula begins to move away from the camera, the indicated corrective action is to follow with the camera, and a trained operator will react automatically in the proper manner.

The alternative embodiment shown in FIG. 3 operates upon the same principle and includes an inclined, partially reflective viewing element 33 in the form of a transmitting mirror positioned along the optical axis 34 of a camera 35. The camera has a lens barrel 37 directed toward a photographic subject 38, and a reference object 39, such as the reticle plate 20 of FIGS. 1 and 2, is supported above the viewing element to reflect the reference object in super-imposed relation with the photographic subject as viewed through the mirror. The viewing element may be notched as in FIGS. 1 and 2, or disposed above the axis 34 as shown in FIG. 3, in the line of sight 40 from the operator to the photographic subject.

In addition, a lamp 41 is provided to illuminate the reference object 39 to form the reflected image on the viewing element 33, and a binocular device 42 is provided for use by the camera operator during operation of the camera. This binocular device can be simply for the purpose of magnification, or can be an aid to stereoscopic vision. Again, the line of sight 40 is through the viewing device 33 toward the subject 38, and the image of the reference object is reflected from the viewing element as indicated at 43, the reference object 39 and the subject 12 being at the same distance from the viewing element.

The second modification shown in FIG. 4 is similar to the first two forms, having an inclined viewing element 44 disposed in front of a camera 45 along the optical axis 47 of the camera, subject 48 to be photographed, and a reference object 49 above the viewing element. In this instance, however, the optical axis 47 passes through the viewing element and a lamp 50 is provided to illuminate the reference object periodically, in timed relation with the operation of the camera's shutter (not shown) to produce the reflected image only when the shutter is closed. The manner of correlating the operation of the shutter with the periodic energization of the lamp 50 is within the skill of the art and thus is not described in detail herein. Persistence of vision will create the illusion that subject and reference object are seen simultaneously.

When insufficient light is present at the reference object 49 to produce any reflection in the absence of illumination from the lamp 50, the subject 48 may be photographed through the viewing element 44 in timed relation with the periodic flashes of illumination from the lamp, and the reflection will not appear on the film. Of course, if it is desired to have the reflection appear on the film in superimposed relation with the subject 48, as a scale or calibration for reference purposes, the lamp 50 simply is left on. While the normal viewing position for he operator is above the camera 45, as indicated at 51, with a line of sight 52 through the viewing element 44 toward the object 48, it will be seen in FIG. 4 that an alternative viewing position 51a is from beneath the mirror, toward the reference object 49 along line 53, so that the reflected image of the subject 48 is viewed in superimposed relation with the image of the reference object.

The third modification, FIG. 5, is similar to the form in FIG. 4 in that the optical axis 54 of the camera 55 passes through the viewing element 57. In this case, however, the reference object 58 is in the normal subject position in line with the optical axis, a lamp 59 periodically illuminates the reference object in timed relation with the operation of the camera, and the subject 60 to be photographed is positioned to reflect its image from the viewing element toward the camera under constant natural or artificial illumination so as to appear in superimposed relation with the reference object when the latter is illuminated. When the lamp 59 is deenergized, however, only the reflection is seen on the mirror.

The normal viewing position for the operator again is above the camera 55, as indicated at 61, with a line of sight 62 reflected off the viewing element from the subject 60. An alternative viewing position 63 in FIG. 5 is behind the mirror, toward the reflection of the reference object 58, along line 64, so that the transmitted image of the subject 60 is viewed in superimposed relation with the reflected image of the reference object 58.

Again, the camera shutter is open while the lamp 59 is deenergized, but now photographs the reflected image of the object 60 from the viewing element 57. This illustrates the versatility of the invention for use with objects in unusual positions relative to the optical axis, for example, laterally or vertically spaced from the axis.

From the foregoing, it will be evident that the present invention provides a novel rangefinder 10 which is simple and inexpensive in construction and operation, yet highly effective for its intended purpose because it provides for direct and continuous viewing of the subject being photographed and the superimposed image of the reference object, for effective visual evaluation of changes in the relative distance of the subject from the camera. Although only an initial set-up has been described, it will be evident that changes in the camera-to-subject distance may be compensated for by corresponding changes in the focus calibration of the camera, and that these changes in camera calibration may be transmitted through a suitable linkage (not shown) to the reference object to correspondingly vary its position, and vice versa. Moreover, lens systems may be used between one of the objects and the viewing element to permit variations from the 1-to-1 ratio that is preferred and, if desired, a three-dimensional reference object can be substituted for the planar reticle herein disclosed to provide a three-dimensional frame of reference with respect to object positions.

Variations in the angle, the degree of reflectivity and the position of the viewing element relative to the optical axis may be made without departing from the present invention in order to suit a particular set of circumstances. Thus, while several illustrative embodiments have been illustrated and described herein, these and other changes may be made by those skilled in the art without departing from the spirit and scope of the invention.

I claim:

1. For use in combination with a camera for photographing a photographic object, a rangefinder having:
   a partially reflective, transparent viewing element having a portion through which said object may be viewed;
   means for mounting said viewing element on the camera with said portion inclined upwardly and forwardly to extend across the line of sight of the operator of the camera toward the position of the object to be photographed;
   a frame mountable on said camera and extending above said viewing element;
   and means on said frame for supporting a reference object on said frame above said portion of said viewing element to reflect an image of said reference object back along said line of sight toward the operator in superimposed relation with the real image of said photographic object viewed by the operator through said viewing element, said supporting means including adjustments for varying the position of said reference object relative to said viewing element to space the reference object from the viewing element by the same distance that the photographic object is to be spaced from the viewing element when the camera is properly focused.

2. A rangefinder as defined in claim 1 in which said viewing element is a half-silvered mirror.

3. A rangefinder as defined in claim 2 in which said mirror is inclined upwardly and forwardly from said camera and is formed with an opening through which the photographic object is photographed.

4. A rangefinder as defined in claim 1 in which said supporting means include adjustments for lateral positioning and height positioning of the reference object.

5. A rangefinder as defined in claim 1 in which a plate is mounted on said supporting means with a reticle thereon constituting the reference object.

6. A rangefinder as defined in claim 1 in which said viewing element is disposed in front of said camera for photographing of said photographic object through a reflecting portion of the viewing element, and further including means for periodically illuminating said reference object in timed relation with the operation of the camera to illuminate said reference object only when the shutter of the camera is closed.

7. The method of setting and maintaining the focus of a camera relative to a moving subject to be photographed, said method comprising the steps of;
   initially focusing the camera on an initial position of the subject;
   supporting a partially reflective, transparent viewing element in a selected position relative to said camera for viewing of said initial position from said camera through the viewing element;
   positioning a reference object relative to said viewing element to reflect an image of the reference object from the viewing element back toward the camera and spacing said reference object the same distance from said viewing element as said initial position is spaced from the viewing element;
   and moving said camera relative to said subject to maintain the virtual image of said reference object and said subject in the same apparent planes relative to said viewing element as the subject moves.

8. The method defined in claim 7 in which said viewing element is positioned for photographing of said subject around the viewing element.

9. The method defined in claim 7 in which said viewing element is positioned for photographing of said subject through the viewing element, and including the further step of illuminating said reference object in timed relation with the operation of said camera to reflect its image only when the shutter is closed.

10. The method defined in claim 7 in which said viewing element is positioned for photographing of said subject through the viewing element and for photographing the image of said reference object in superimposed relation therewith.

11. A rangefinding method comprising the steps of:
    positioning a first object in a selected first position;
    positioning a partially reflective, transparent viewing element for viewing of said first object through the viewing element;
    positioning a second object relative to said viewing element in a second position a selected distance from said viewing element to reflect an image of the second object from the portion of the viewing element in which the first object is viewed;
    and moving one of said objects relative to said viewing element to change the spacing of said one object from the viewing element until the position of the image of said one object coincides with the image of the other object.

12. In combination with a camera for photographing a photographic object and having an optical axis, a stage for supporting a photographic object, and means supporting said camera and said stage for selective relative movement to maintain the camera in focus during movement of the photographic object, a rangefinder comprising: a reference object;
    a viewing element having a partially reflective transparent portion through which one of said objects can be viewed;
    means mounting said viewing element on said camera with said partially reflective transparent portion in a plane extending across the line of sight of the operator of the camera toward the position of said one of said objects positioned along said optical axis;

and means adjustably supporting said reference object on said camera for movement therewith and for positioning said reference object a preselected distance from one side of said viewing element, so that an image of said reference object can be viewed while looking along said line of sight through said partially reflective transparent portion while said stage is spaced from the other side of said viewing element a distance approximately the same as said preselected distance and positioned to display the image of said photographic object against the image of said reference object for stereoscopic evaluation of the relative distances of said objects from said viewing element and for selective movement of said camera relative to said stage to focus the camera on the image of said photographic object and to maintain the focus as the photographic object moves on said stage.

13. The combination defined in claim 12 in which said reference object is positioned along said optical axis for direct viewing along said line of sight, and said stage is positioned for reflection of an image from said viewing element toward said camera along said optical axis, and further including means for illuminating said reference object periodically in timed relation with the operation of said camera whereby the reflection of said photographic object may be photographed from said viewing element without photographing the real image of said reference object through said viewing element.

* * * * *